United States Patent
Jung et al.

(10) Patent No.: US 11,212,743 B2
(45) Date of Patent: *Dec. 28, 2021

(54) APPARATUS AND METHOD FOR CONNECTING TO A LOCAL AREA COMMUNICATION IN A PORTABLE TERMINAL

(71) Applicant: Samsung Electronics Co., Ltd., Suwon-si (KR)

(72) Inventors: Bu-Seop Jung, Suwon-si (KR); Edwin Joseph Vimal Bastin, Suwon-si (KR); Ji-Hyun Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 76 days.

This patent is subject to a terminal disclaimer.

(21) Appl. No.: 16/431,217

(22) Filed: Jun. 4, 2019

(65) Prior Publication Data

US 2019/0289540 A1  Sep. 19, 2019

Related U.S. Application Data

(63) Continuation of application No. 14/082,761, filed on Nov. 18, 2013, now abandoned.

(30) Foreign Application Priority Data

Nov. 16, 2012  (KR) .......................... 10-2012-0130574

(51) Int. Cl.
   *H04W 48/20*   (2009.01)
(52) U.S. Cl.
   CPC .................................. *H04W 48/20* (2013.01)
(58) Field of Classification Search
   None
   See application file for complete search history.

(56) References Cited

U.S. PATENT DOCUMENTS

| 6,560,443 | B1 | 5/2003 | Vaisanen et al. |
| 8,823,494 | B1 | 9/2014 | Kovitz et al. |

(Continued)

FOREIGN PATENT DOCUMENTS

| CN | 1684441 A | 10/2005 |
| CN | 1714594 A | 12/2005 |

(Continued)

OTHER PUBLICATIONS

Wi-Fi Certified Passpoint Architecture for Public Access Aruba White Pater Wi-Fi Certified Passpoint Architecture for Public Access Wi-Fi Certified Passpoint Architecture for Public Access Aruba White Paper XP055108537; Jun. 29, 2012.

(Continued)

*Primary Examiner* — Noel R Beharry
*Assistant Examiner* — Rodrick Mak
(74) *Attorney, Agent, or Firm* — Jefferson IP Law, LLP

(57) ABSTRACT

An apparatus and a method for connecting to a local area communication resource in a portable terminal are provided. The method includes receiving access point connection-related information and automatic connection support-related information from a plurality of access points, identifying at least one access point capable of supporting automatic connection among the plurality of access points based on the automatic connection support-related information, receiving connection information from an information server connected to the at least one access point, selecting one access point from the at least one access points based on basic service set (BSS) link information included in the access point connection-related information with respect to the at least one access point, Received Signal Strength Indication (RSSI) information, and link information of an external network included in the connection information, (Continued)

and performing a local area communication with the selected access point.

12 Claims, 6 Drawing Sheets

(56) References Cited

U.S. PATENT DOCUMENTS

| | | |
|---|---|---|
| 2004/0137908 A1 | 7/2004 | Sinivaara et al. |
| 2005/0032535 A1 | 2/2005 | Shitama et al. |
| 2005/0250528 A1 | 11/2005 | Song et al. |
| 2006/0039360 A1 | 2/2006 | Thawani et al. |
| 2006/0039395 A1 | 2/2006 | Perez-Costa et al. |
| 2006/0072502 A1* | 4/2006 | Crandall ............... H04W 72/02 370/329 |
| 2006/0126555 A1* | 6/2006 | Wang ................... H04W 36/22 370/328 |
| 2006/0264212 A1 | 11/2006 | Sekhar |
| 2007/0010261 A1 | 1/2007 | Dravida et al. |
| 2007/0037595 A1 | 2/2007 | Shpak |
| 2007/0104126 A1 | 5/2007 | Calhoun et al. |
| 2007/0127417 A1 | 6/2007 | Kalika |
| 2008/0102852 A1 | 5/2008 | Du et al. |
| 2008/0320108 A1 | 12/2008 | Murty et al. |
| 2009/0109855 A1* | 4/2009 | Gong ................... H04W 16/10 370/238 |
| 2009/0124284 A1 | 5/2009 | Scherzer et al. |
| 2010/0208681 A1* | 8/2010 | Elmaleh ................ H04W 16/14 370/329 |
| 2010/0290424 A1 | 11/2010 | Collingrige |
| 2011/0013560 A1 | 1/2011 | Zhang et al. |
| 2011/0158143 A1 | 6/2011 | Yun et al. |
| 2011/0280233 A1 | 11/2011 | Choi et al. |
| 2011/0299422 A1 | 12/2011 | Kim et al. |
| 2012/0033568 A1 | 2/2012 | Park et al. |
| 2012/0076118 A1 | 3/2012 | Montemurro et al. |
| 2012/0128090 A1 | 5/2012 | Seok |
| 2012/0188876 A1 | 7/2012 | Chow et al. |
| 2012/0207115 A1 | 8/2012 | Oh |
| 2013/0039275 A1 | 2/2013 | Patil et al. |
| 2013/0053047 A1* | 2/2013 | Rai ....................... H04W 16/18 455/448 |
| 2013/0231099 A1 | 9/2013 | Meshkati et al. |
| 2014/0055490 A1 | 2/2014 | Mule et al. |
| 2014/0092731 A1 | 4/2014 | Gupta |
| 2014/0112162 A1 | 4/2014 | Tavildar et al. |
| 2014/0112327 A1* | 4/2014 | Calcev ................. H04W 48/14 370/338 |
| 2014/0113621 A1 | 4/2014 | Lerenius et al. |
| 2015/0036539 A1 | 2/2015 | Townend |
| 2015/0063101 A1 | 3/2015 | Touati et al. |
| 2020/0092295 A1* | 3/2020 | Hartley ................. H04L 63/101 |

FOREIGN PATENT DOCUMENTS

| | | |
|---|---|---|
| JP | 2005039571 A | 2/2005 |
| KR | 10-2009-0013180 A | 2/2009 |
| WO | 2011-052447 A1 | 5/2011 |
| WO | 2011-132174 A1 | 10/2011 |

OTHER PUBLICATIONS

"Wi-Fi Certified Passpoint" XP55080844; Oct. 1, 2011.
"Key Issue WLAN Load Information" XP050683281; Oct. 1, 2012.
Korean Office Action dated Nov. 20, 2018, issued in Korean Patent Application No. 10-2012-0130574.

* cited by examiner

APPARATUS AND METHOD FOR CONNECTING TO A LOCAL AREA COMMUNICATION IN A PORTABLE TERMINAL

CROSS-REFERENCE TO RELATED APPLICATION(S)

This application is a continuation application of prior application Ser. No. 14/082,761, filed on Nov. 18, 2013 which was based on and claimed priority under 35 U.S.C. § 119(a) of a Korean patent application number 10-2012-0130574, filed on Nov. 16, 2012 in the Korean Intellectual Property Office, the disclosure of which is incorporated by reference herein in its entirety.

BACKGROUND OF THE INVENTION

1. Field of the Invention

The present invention relates to a portable terminal. More particularly, although not exclusively, the present invention relates to an apparatus and a method for connecting to a local area communication resource in a portable terminal.

2. Description of the Related Art

A portable terminal such as a smart phone or a tablet Personal Computer (PC) provides various useful functions for a user by various software applications. Accordingly, the portable terminal has evolved into a device in which various types of information are used in addition to a sound communication function such as a telephone, by providing various functions. In particular, the portable terminal provides a local area communication function for providing a data service.

In order to provide the local area communication function, the portable terminal searches for access points in the vicinity, and connects to any one of the searched access points and the local area communication resource. At this point, the portable terminal is connected to an access point provided by a first service provider having a priority designated in advance among a plurality of access points provided by different service providers. That is, the first service provider is selected from the plurality of different service providers according to a pre-designated priority.

However, even when an access point provided by a second service provider not having a priority provides a better communication environment than the access point of the first service provider, since the portable terminal may not be connected to an access point of the second service provider, a user of the portable terminal may not have an opportunity to receive the local area communication resource in the better communication environment. Therefore, a demand for a way to address the problem has been required.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method for connecting to a local area communication resource via an access point with an excellent communication environment among a plurality of access points in a portable terminal.

Another aspect of the present invention is to provide an apparatus and a method for selecting an access point having an excellent communication environment among a plurality of access points based on link information of an external network in a portable terminal, and connecting to a local area communication resource by the selected access point.

It is an aim of certain embodiments of the invention to solve, mitigate or obviate, at least partly, at least one of the problems and/or disadvantages associated with the prior art. Certain embodiments aim to provide at least one of the advantages described below In accordance with an aspect of the present invention, an apparatus (e.g. a portable terminal) for connecting to a local area communication resource is provided. The apparatus includes a communication unit (e.g. information (a local area communication unit), and a controller which receives first information (e.g. access point connection-related information and automatic connection support-related information) from the at least one access points, identifies at least one access point capable of performing automatic connection support among the plurality of access points based on the first information (e.g. based on the automatic connection support-related information), receives second information (e.g. connection information) from an information server connected to the at least one access point, selects one access point from the plurality of access points based on at least one, and optionally all, of the first information (e.g. basic service set (BSS) link information included in the access point connection-related information with respect to the at least one access point), received signal strength indication, and the second information (e.g. link information of an external network included in the connection information), and performs communication (e.g. a local area communication) with the selected access point.

Another aspect of the invention provides a portable terminal comprising: a communication unit (e.g. a local area communication unit); and a controller adapted to receive access point connection-related information and automatic connection support-related information from a plurality of access points (e.g. via the communication unit), identify at least one access point capable of performing automatic connection support among the plurality of access points based on the automatic connection support-related information, receive connection information from an information server connected to the at least one access point (e.g. via the communication unit), select one access point from the plurality of access points based on at least one of basic service set (BSS) link information included in the access point connection-related information with respect to the at least one access point, Received Signal Strength Indication (RSSI) information, and link information of an external network included in the connection information, and perform communication (e.g. a local area communication) with the selected access point (e.g. via the communication unit).

In accordance with another aspect of the present invention, a method for connecting to a local area communication resource in a portable terminal is provided. The method may also be described as a method of connecting a portable terminal to a communication resource (e.g. to a local area communication resource, such as an access point) The method includes receiving first information (e.g. access point connection-related information and automatic connection support-related information) from a plurality of access points, identifying at least one access point capable of supporting automatic connection among the plurality of access points based on the first information (e.g. based on the automatic connection support-related information), receiving second information (e.g. connection information) from an information server connected to the at least one access point, selecting one access point from the plurality of access points based on at least one, and optionally on all, of the first information (e.g. BSS link information included in the access point connection-related information with respect to the at least one access point), received signal strength indication, and second information (e.g. link information of an external network included in the connection information), and performing communication (e.g. a local area communication) with the selected access point.

Another aspect provides a portable terminal comprising apparatus in accordance with any of the above-mentioned aspects, or adapted to implement a method in accordance with any of the above-mentioned aspects.

Another aspect of the invention provides a computer program comprising instructions arranged, when executed, to implement a method and/or apparatus in accordance with any one of the above-described aspects. A further aspect provides machine-readable storage storing such a program.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The portable terminal according to the exemplary embodiments of the present invention is an electronic device that is portable and easy to carry, and may be a video phone, a cellular phone, a smart phone, an International Mobile Telecommunication 2000 (IMT-2000) terminal, a Wideband-Code Division Multiple Access (WCDMA) terminal, a Universal Mobile Telecommunication Service (UMTS) terminal, a Personal Digital Assistant (PDA), a Portable Multimedia Player (PMP), a Digital Multimedia Broadcasting (DMB) terminal, an E-Book terminal, a Portable Computer (PC)(for example, a notebook or tablet PC), a digital camera, or the like.

Figure 1:
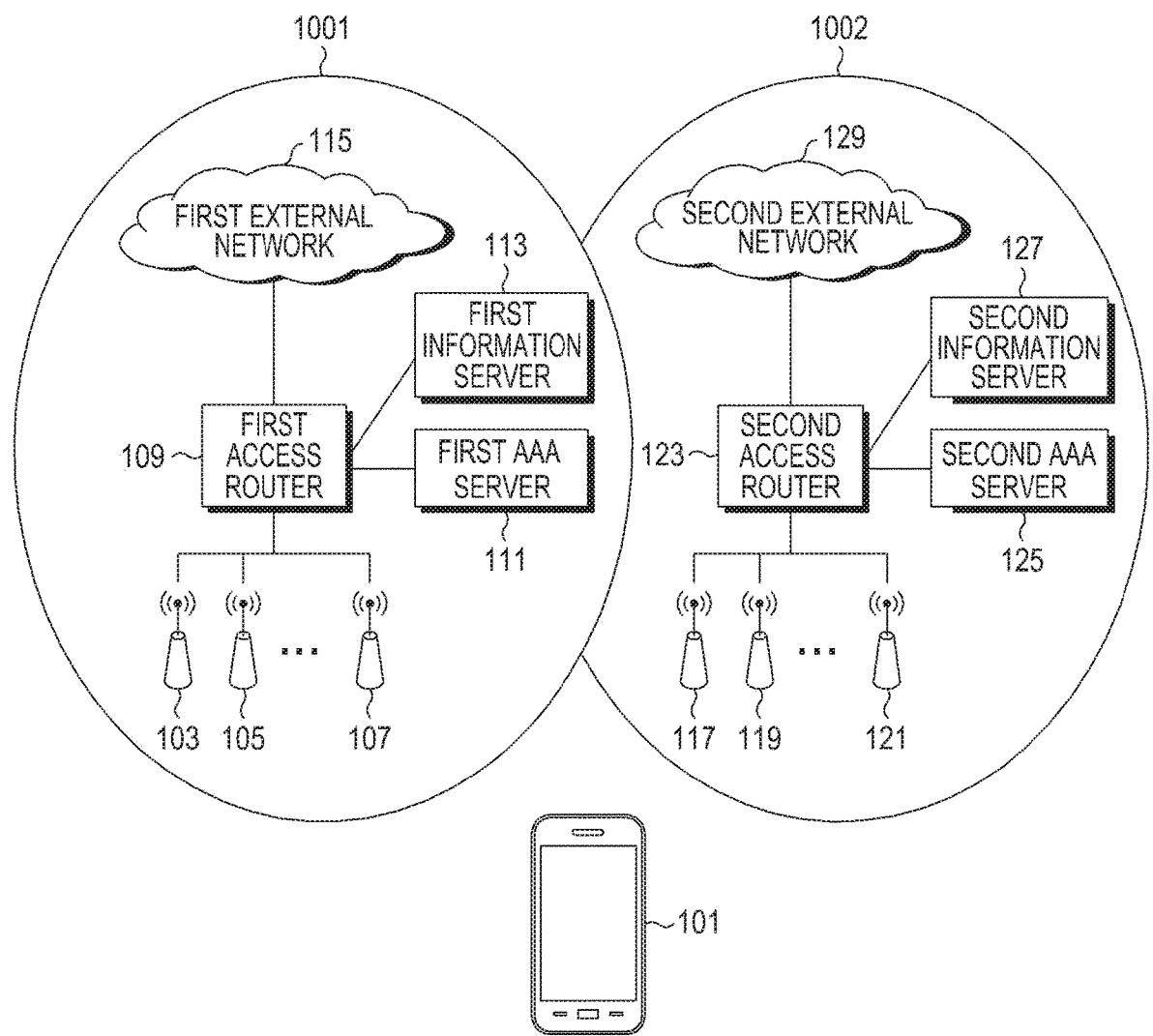
FIG. 1 is a diagram illustrating a configuration of a local area communication system according to an exemplary embodiment of the present invention.

FIG. 1 is a diagram illustrating a configuration of a local area communication system according to an exemplary embodiment of the present invention.

Referring to FIG. 1, a local area communication system includes a portable terminal 101, first, third, and fifth Access Points (AP) 103, 105, and 107, a first access router 109, a first Authentication, Authorization, and Accounting (AAA) server 111, a first information server 113, a first external network 115, second, fourth, and sixth access points 117, 119, and 121, a second access router 123, a second AAA server 125, a second information server 127, and a second external network 129.

Here, a first service provider 1001 provides the first, third, and fifth access points 103, 105, and 107, the first access router 109, the first AAA server 111, the first information server 113, and the first external network 115, and a second service provider 1002 provides the second, fourth, and sixth access points 117, 119, and 121, the second access router 123, the second AAA server 125, the second information server 127, and the second external network 129. The first service provider 1001 and the second service provider 1002 may be different from each other. For example, the first service provider 1001 may be SK Telecom, and the second service provider 1002 may be Korea Telecom Freetel (KTF).

With reference to each component, the first access router 109 is connected to the first, third, and fifth access points 103, 105, and 107, the first information server 113, the first AAA server 111, and the first external network 115. The first external network 115 is an external network connected to a local area network generated by the first, third, and fifth access points 103, 105, and 107.

The first information server 113 stores information required to automatically connect to a local area communication resource among the portable terminal 101 and any one of the first, third, and fifth access points 103, 105, and 107. Especially, the first information server 113 stores connection information with respect to the first, third, and fifth access points 103, 105, and 107, and transmits the connection information to the portable terminal 101 according to a request of the portable terminal 101.

Here, the connection information refers to information for automatically connecting the portable terminal 101 and an access point to each other, and includes link information of an external network connected to a corresponding access point, information of a provider providing a local area network, and connection information including a connection type for connecting to the local area network. The link information of the external network includes a downlink speed, a downlink load rate, an uplink speed, and an uplink load rate of the external network.

The first, third, and fifth access points 103, 105, and 107 provide the local area communication resource for the portable terminal 101. For example, the local area communication resource may be WiFi. Each of the first, third, and fifth access points 103, 105, and 107 transmits access point-related information and automatic connection support-related information to the portable terminal 101. Here, the access point-related information includes information such as basic service set (BSS) link information, and the BSS link information includes a network load of the BSS, a channel load rate, or a number of portable terminals connected to a corresponding access point. The automatic connection support-related information refers to information relating to a technology in which the corresponding access point can be automatically connected to the local network without input by a user of the portable terminal 101. For example, if the local area communication resource is WiFi, the automatic connection support technology may be referred to as Hotspot 2.0.

If a connection information request message is received from the portable terminal 101, each of the first, third, and fifth access points 103, 105, and 107 transmits the connection information request message to the first information server 113. Each of the first, third, and fifth access points 103, 105, and 107 receives a connection information message in response to the connection information request messages, and transmits the received connection information messages to the portable terminal 101. Here, the connection information request message is a message including a command requesting connection information, and the connection information message is a message including the connection information.

The second access router 123 is connected to the second, fourth, and sixth access points 117, 119, and 121, the second information server 127, the second AAA server 125, and the second external network 129. In addition, the second external network 129 is an external network connected to a local area network generated by the second, fourth, and sixth access points 117, 119, and 121.

The second information server 127 stores information required to automatically connect to a local area communication resource among the portable terminal 101 and any of the second, fourth, and sixth access points 117, 119, and 121. Especially, the second information server 127 stores connection information with respect to the second, fourth, and sixth access points 117, 119, and 121, and transmits the connection information to the portable terminal 101 according to the request of the portable terminal 101.

The second, fourth, and sixth access points 117, 119, and 121 provide the local area communication resource for the portable terminal 101. Each of the second, fourth, and sixth access points 117, 119, and 121 transmits access point-related information and automatic connection support-related information to the portable terminal 101. Each of the second, fourth, and sixth access points 117, 119, and 121 receives a connection information request message from the portable terminal 101, and then transmits the connection information request message to the second information server 127. Each of the second, fourth, and sixth access points 117, 119, and 121 receives a connection information message in response to the connection information request message, and transmits the received connection information message to the portable terminal 101.

The portable terminal 101 is connected to any one of the first to sixth access points 103, 105, 107, 117, 119, and 121 to provide the local area communication resource for a user.

If it is requested, by a user, to perform a local area communication, the portable terminal 101 performs access point scanning to search for access points in the vicinity of the portable terminal 101. In addition, the portable terminal 101 receives the access point-related information and the automatic connection support-related information from the first to sixth access points 103, 105, 107, 117, 119, and 121 by performing the access point scanning. When the portable terminal 101 receives a signal including the access point-related information and the automatic connection support-related information from each of the first to sixth access points 103, 105, 107, 117, 119, and 121, the portable terminal 101 generates Received Signal Strength Indications (RSSI) with respect to the first to sixth access points 103, 105, 107, 117, 119, and 121 by measuring the strength of the received signal.

In addition, the portable terminal 101 identifies at least one access point providing the automatic connection support technology among the first to sixth access points 103, 105, 107, 117, 119, and 121 by using the automatic connection support-related information received from the first to sixth access points 103, 105, 107, 117, 119, and 121. The portable terminal 101 performs at least one identified access point and network discovery. Here, the network discovery refers to an operation for obtaining the connection information required for automatically connecting the portable terminal 101 and an access point.

The portable terminal 101 receives the connection information from at least one identified access point by performing the network discovery.

The portable terminal 101 selects any one of the at least one identified access points, by using the BSS link information corresponding to the at least access point, the received signal strength indications and the link information of the external network, and connects to the selected access point and connects to the selected access point and the local area communication resource by using the BSS link information corresponding to the selected access point and the link information of the received signal strength indications and the external network.

Meanwhile, if the local area communication system of an exemplary embodiment of the present invention conforms to the 802.11u standard, the automatic connection support-related information may be a Hotspot 2.0 indication element as defined in the 802.11u/D13.0 standard, and the first and second information servers 113 and 127 may be first and second Access Network Query Protocol (ANQP) servers. The connection information may be a Hotspot 2.0 ANQP element.

Figure 2:
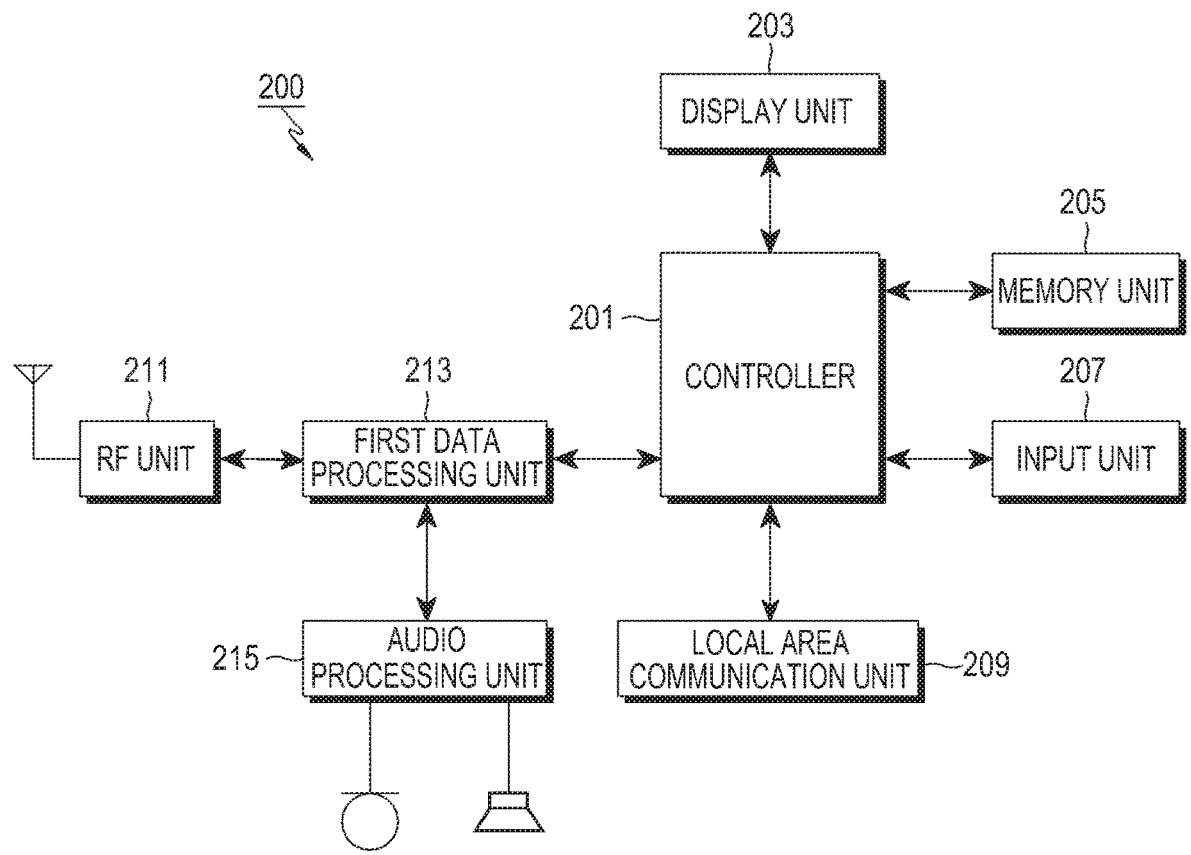
FIG. 2 is a block diagram illustrating a portable terminal according to an exemplary embodiment of the present invention.

FIG. 2 is a block diagram illustrating a portable terminal according to an exemplary embodiment of the present invention.

Referring to FIG. 2, the portable terminal 200 includes a controller 201, a display unit 203, a memory unit 205, an input unit 207, a local area communication unit 209, a Radio Frequency (RF) unit 211, a first data processing unit 213, and an audio processing unit 215.

With reference to each component, the RF unit 211 performs a wireless communication function of the portable terminal 101. In more detail, the RF unit 211 includes a wireless transmitter that performs up-conversion and amplification with respect to the frequency of a transmitted signal and a wireless receiver that performs low-noise amplification and down-conversion of a received signal. The data processing unit 213 includes a transmitter that encodes and modulates the transmitted signal and a receiver that decodes and demodulates the received signal. Here, the data processing unit 213 includes a modulator-demodulator (modem) and a coder-decoder (codec). The codec may include a data codec processing packet data and an audio codec processing an audio signal such as a sound.

The audio processing unit 215 performs a function of reproducing the received audio signal output from the data processing unit 213 or transmitting the transmitted audio signal generated from a microphone to the data processing unit 213. In addition, the input unit 207 includes keys for inputting figure and character information and function keys for setting various functions, and the display unit 203 displays video signals on a screen, and displays data requested to be output from the controller 201.

If the display unit 203 is implemented by a touch display screen type such as a capacitive or resistive type, the input unit 207 may include minimum predetermined 'hard' keys, and the display unit 203 may at least partially substitute a 'soft' key input function of the input unit 207.

The memory unit 205 includes a program memory and a data memory. Here, the program memory stores booting code and an Operating System (OS) for controlling a general operation of the portable terminal 101, and the data memory stores various data generated during an operation of the portable terminal.

The local area communication unit 209 connects any one of the first to sixth access points 103, 105, 107, 117, 119, and 121 and the local area communication resource according to the control of the controller 201. For example, the local area communication resource may be WiFi.

The controller 201 performs a function of controlling the overall operation of the portable terminal 101. The controller 201 is connected to any one of the first to sixth access points 103, 105, 107, 117, 119, and 121 to provide the local area communication resource for a user.

In more detail, if it is requested to perform the local area communication by the user, the controller 201 performs access point scanning for searching access points positioned around the portable terminal 101. If the first to sixth access points 103, 105, 107, 117, 119, and 121 are in the vicinity of the portable terminal 101, the controller 201 receives access point-related information and automatic connection support-related information from each of the first to sixth access points 103, 105, 107, 117, 119, and 121 by performing access point scanning. When the controller 201 receives a signal including access point-related information and automatic connection support-related information from each of the first to sixth access points 103, 105, 107, 117, 119, and 121, the controller 201 generates received signal strength indications with respect to the first to sixth access points 103, 105, 107, 117, 119, and 121 by measuring the strength of the received signals.

Here, the access point-related information includes BSS link information, and the BSS link information includes a network load and a channel load rate of a BSS and the number of portable terminals connected to the corresponding access point. In addition, the automatic connection support-related information refers to the technology for automatically connecting the access point to the local area network without input of a user of the portable terminal 101. For example, if the local area communication resource is WiFi, the automatic connection support technology may be referred to as Hotspot 2.0.

In addition, the controller 201 identifies at least one access point providing an automatic connection support technology from the first to sixth access points 103, 105, 107, 117, 119, and 121 by using automatic connection support-related information received from the first to sixth access points 103, 105, 107, 117, 119, and 121. The controller 201 performs network discovery with at least one identified access point. Here, the network discovery refers to an operation for obtaining connection information required for automatically connecting the portable terminal 101 and an access point.

The controller 201 receives connection information from at least one identified access point by performing the network discovery. Here, the connection information refers to information for automatically connecting the portable terminal 101 and an access point, and includes link information of an external network connected to the corresponding access point, provider information providing a local area network, and connection information including a connection type for connecting the local area network. The link information of the external network includes a downlink speed, a downlink load rate, an uplink speed, and an uplink load rate of the external network.

In addition, the controller 201 selects any one of at least one access points by using BSS link information corresponding to the at least one access point, the received signal strength indication, and link information of the external network, and connects the selected access point and the local area communication resource.

At this point, the controller 201 may select one access point among at least one access points by using two methods as follows.

A first method is to select an access point by using a download speed of an external network, a channel load rate of a BSS, and received signal strength indication.

In more detail, the controller 201 searches a download speed of at least one external network corresponding to at least one access point from the received link information of the external network. In addition, the controller 201 compares the searched download speed of the at least one external network with a predetermined standard download speed. Based on the comparison result, the controller 201 identifies at least one access point corresponding to a download speed of an external network higher than the predetermined standard download speed among the at least one access points.

In addition, the controller 201 searches at least one channel load rate corresponding to at least one access point identified from the received BSS link information. In addition, the controller 201 compares the at least one searched channel load rate with a predetermined standard channel load rate. Based on the comparison result, the controller 201 determines at least one access point corresponding to a channel load rate lower than the predetermined standard channel load rate among the at least one identified access points.

The controller 201 searches at least one RSSI value corresponding to the at least determined access point, and identifies a maximum RSSI value of the searched RSSI value. The controller 201 selects one access point corresponding to the maximum RSSI value among the at least one determined access point. The controller 201 connects to the selected access point and the local area communication resource.

A second method is to select an access point in consideration of a transmission speed.

In more detail, the controller 201 searches at least one channel load rate corresponding to at least one access point from BSS link information, and searches at least one RSSI value corresponding to the at least one access point among the determined RSSI values.

The controller 201 estimates at least one transmission speed corresponding to the at least one access point based on the at least one searched channel load rate and at least one RSSI value.

In more detail, the memory unit 205 stores a table with digitized transmission speeds corresponding to the RSSI values in advance, and the controller 201 searches at least one transmission speed corresponding to the at least one searched RSSI value using the table. The controller 201 estimates at least one transmission speed corresponding to the at least one access point by using the at least one searched transmission speed and at least one channel load rate. For example, if the transmission speed corresponding to the RSSI value of the first access point is 30 Megabits per second (Mbps), and the channel load rate of the first access point is 50%, the controller 201 may estimate the transmission speed (15 Mbps) with respect to the first access point by multiplying the transmission speed corresponding to the RSSI value and the channel load rate corresponding to the RSSI value.

The controller 201 searches at least one transmission speed corresponding to at least one access point from received link information of the external network. The controller 201 estimates at least one final transmission speed based on the at least one estimated transmission speed and the at least one searched transmission speed of the external network. For example, if the estimated transmission speed of the first access point 103 is 10 Mbps and the transmission speed of the external network connected to the first access point 103 is 100 Mbps, the controller 201 may determine the minimum transmission speed as the final transmission speed (10 Mbps) of the first access point 103 among the estimated transmission speed and the transmission speed of the external network. Here, the transmission speed of the external network may be a downlink speed or an uplink speed of the external network.

The controller 201 identifies a maximum final transmission speed with a maximum value among at least one estimated final transmission speed, and selects one access point corresponding to the maximum final transmission speed among at least one access point. The controller 201 connects the selected access point and the local area communication resource.

Figure 3:
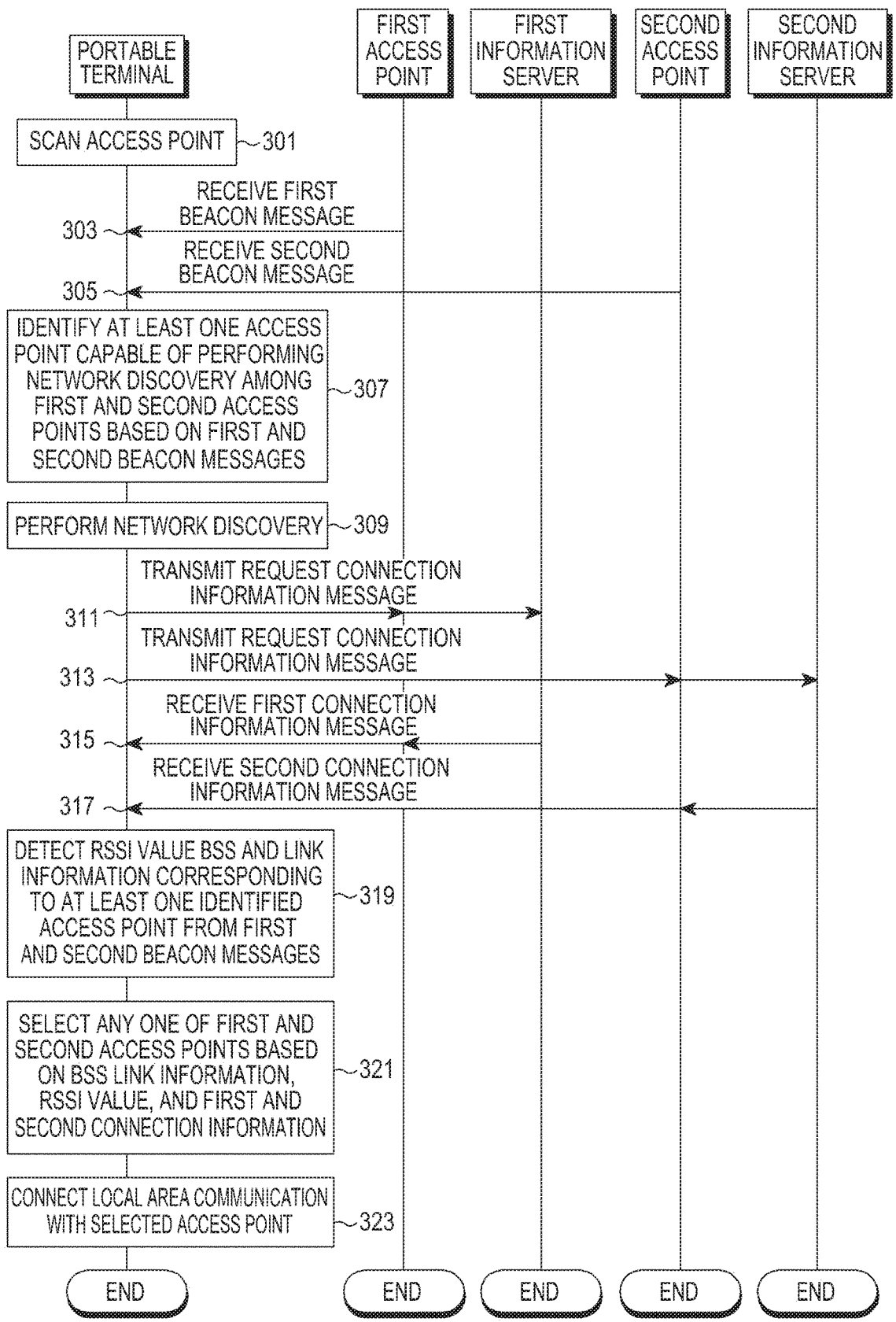
FIG. 3 is a sequence diagram illustrating an operation of connecting to a local area communication resource in a local area communication system according to an exemplary embodiment of the present invention.

FIG. 3 is a sequence diagram illustrating an operation of connecting to a local area communication resource in a local area communication system according to an exemplary embodiment of the present invention.

Referring to FIG. 3, in step 301, if it is requested by a user to perform the local area communication, the portable terminal 101 performs access point scanning for searching for access points in the vicinity of the portable terminal 101, and then the process proceeds to step 303.

The first access point 103 transmits a first beacon message which the portable terminal receives in step 303, and the second access point 105 transmits a second beacon message which the portable terminal receives in step 305, and then the process proceeds to step 307. Here, the first beacon message includes access point-related information and automatic connection support-related information. The access point-related information includes BSS link information, and the BSS link information includes information such as the network load of the BSS, the channel load rate, and the number of portable terminals connected to the corresponding access points. The automatic connection support-related information refers to information relating to the technology for automatically connecting the corresponding access point to the local area network without the input by a user of the portable terminal 101. For example, if the local area communication resource is WiFi, the automatic connection support technology may be referred to as Hotspot 2.0.

In step 307, the portable terminal 101 receives first and second beacon messages, and identifies at least one access point capable of performing the network discovery among the first and second access points based on the received first and second beacon messages, and then the process proceeds to step 309. Here, the network discovery refers to an operation for obtaining connection information required for automatically connecting the portable terminal 101 and an access point. The first and second beacon messages may be received in any order.

In more detail, when first and second beacon messages are received from first and second access points 103 and 117, the portable terminal 101 generates RSSI values with respect to the first and second access points 103 and 117 by measuring the strength of the signals of the first and second beacon messages. The portable terminal 101 analyzes the first and second beacon messages, and determines whether the first and second access points 103 and 117 can perform the network discovery or not based on the analysis result.

For example, the portable terminal 101 identifies whether the first beacon message includes automatic connection support-related information by analyzing the first beacon message. As a result of the identification, if the first beacon message includes the automatic connection support-related information, the portable terminal 101 determines that the first access point 103 may perform the network discovery since the first access point 103 provides automatic connection support technology. Otherwise, if first beacon message does not include the automatic connection support-related information, the portable terminal 101 determines that the first access point 103 does not perform the network discovery since the first access point 103 does not provide the automatic connection support technology. In the same manner, the portable terminal 101 may identify whether the second access point 105 can perform the network discovery.

Meanwhile, for the sake of the simple description of an exemplary embodiment of the present invention, it is assumed that the first and second access points 103 and 117 both can perform the network discovery.

The portable terminal 101 performs the network discovery with the first and second access points 103 and 117 capable of performing the network discovery in step 309, the portable terminal 101 transmits connection information request messages through the first and second access points 103 and 117 to the first and second information servers 113 and 127 in steps 311 and 313, and then the process proceeds to step 315.

The first information server 113 transmits, and the portable terminal receives, the first connection information messages through the first access point 103 in response to the connection information request messages in step 315, the second information server 127 transmits, and the portable terminal receives, second connection information messages through the second access point 105 in response to the connection information request message in step 317, and then the process proceeds to step 319. The first and second connection information messages may be received in any order.

In step 319, the portable terminal 101 searches the RSSI value and the BSS link information corresponding to the at least one access point capable of performing the network discovery from the first and second beacon messages, and then the process proceeds to step 321.

Here, each of the first and second connection information messages includes connection information of the corresponding access points. Connection information refers to information for automatically connecting the portable terminal 101 and an access point, and includes link information of the external network connected to the corresponding access point, provider information providing the local area network, and connection information including the connection type for connecting to the local area network. The link information of the external network includes the downlink speed, the downlink load rate, the uplink speed, and the uplink load rate of the external network.

In step 321, the portable terminal 101 selects any one of the first and second access points 103 and 117 based on the BSS link information, the RSSI value, and the first and second connection information, and then the process proceeds to step 323. In step 323, the portable terminal 101 connects the selected access point and the local area communication resource. At this point, the portable terminal 101 connects the automatically selected access point and the local area communication resource by using the connection information corresponding to the selected access point.

Meanwhile, in steps 301 to 303 of an exemplary embodiment of the present invention, it is described that the portable terminal 101 receives the access point-related information and the automatic connection support-related information by the beacon messages. However, the access point-related information and the automatic connection support-related information can be received through other messages. For example, the portable terminal 101 may transmit probe request messages to neighboring access points, and receive probe response messages including access point-related information and the automatic connection support-related information in response thereto.

Figure 4:
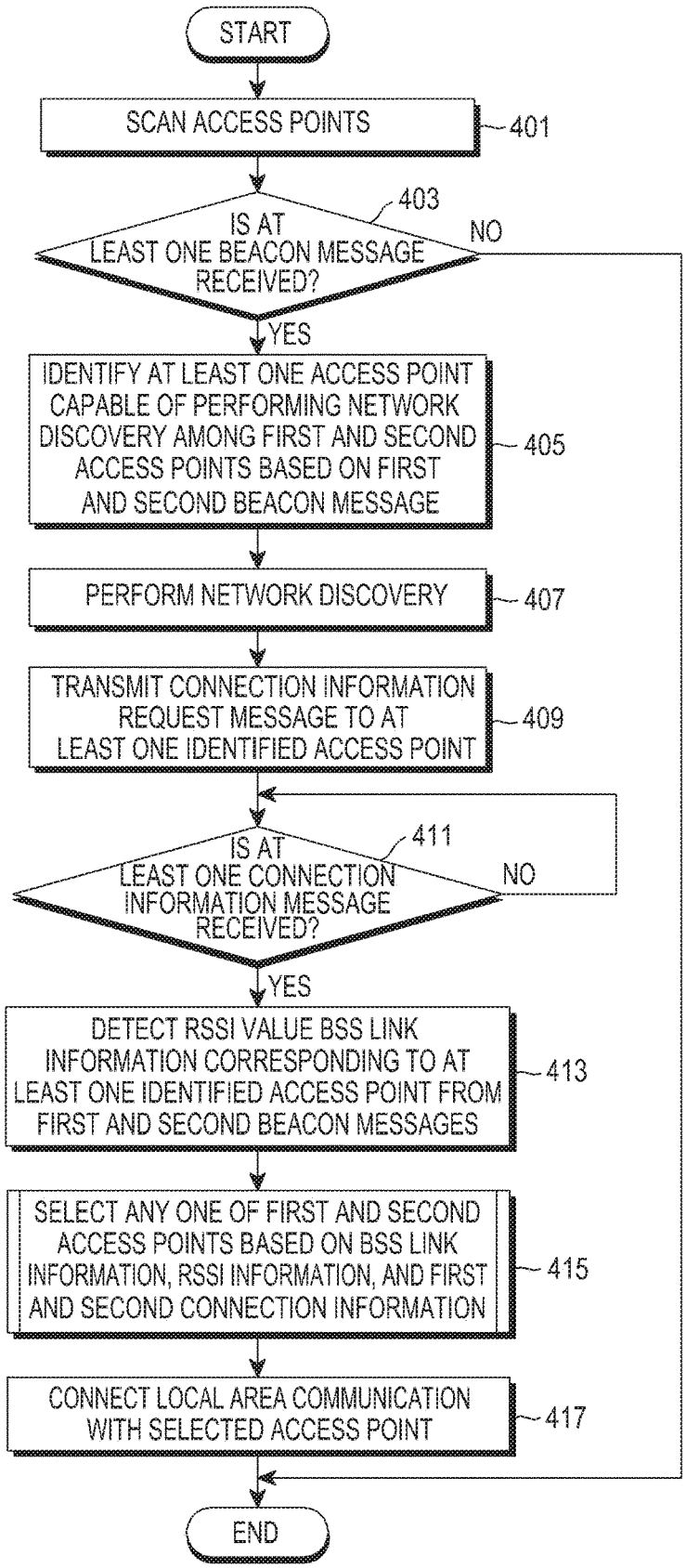
FIG. 4 is a flowchart illustrating an operation of connecting to a local area communication resource in a portable terminal according to an exemplary embodiment of the present invention.

FIG. 4 is a flowchart illustrating an operation of connecting to a local area communication resource in a portable terminal according to an exemplary embodiment of the present invention.

Referring to FIG. 4, in step 401, when it is requested by a user to perform a local area communication, the controller 201 performs access point scanning for searching for access points in the vicinity of the portable terminal 101, and the process proceeds to step 403. At this point, it is assumed that the access points in the vicinity of the portable terminal 101 are the first and second access points 103 and 117.

In addition, in step 403, the controller 201 identifies whether at least one beacon message is received from the first and second access points 103 and 105. As a result of the identification, when a beacon message is received, the controller 201 proceeds to step 405, or terminates the local area communication connection.

If the process proceeds to step 405, the controller 201 receives the first and second beacon messages, the controller 201 identifies at least one access point capable of performing the network discovery among the first and second access points based on the received first and second beacon messages, and the process proceeds to step 407.

In more detail, when the first and second beacon messages are received from the first and second access points 103 and 117, the controller 201 generates RSSI values with respect to the first and second access points 103 and 117 by measuring the strengths of the signals of the first and second beacon messages. In addition, the controller 201 analyzes the first and second beacon messages, and determines whether the first and second access points 103 and 117 can perform the network discovery based on the analysis result.

For example, the controller 201 may identify whether the first beacon message includes the automatic connection support-related information by analyzing the first beacon message. As a result of the identification, if the first beacon message includes the automatic connection support-related information, the controller 201 may determine that the first access point 103 can perform the network discovery since the first access point 103 provides the automatic connection support technology. However, if the first beacon message does not include the automatic connection support-related information, the controller 201 may determine that the first access point 103 does not perform the network discovery since the first access point 103 does not provide the automatic connection support technology. In the same manner, the controller 201 may identify whether the second access point 105 can perform the network discovery.

Meanwhile, for the sake of the simple description, it is assumed that the first and second access points 103 and 117 both can perform the network discovery.

In step 407, the controller 201 performs the network discovery with the first and second access points 103 and 117 capable of performing the network discovery, and then the process proceeds to step 409. In step 409, the controller 201 transmits connection information request messages to the first and second information servers 113 and 127 through the first and second access points 103 and 117, and the process proceeds to step 411.

In step 411, the controller 201 identifies whether at least one connection information message is received in response to the connection information request message. As a result of the identification, if the at least one connection information message is received, the controller 201 proceeds to step 413. If not, the controller 201 repeatedly performs step 411.

If the controller 201 proceeds to step 413, the controller 201 searches the RSSI value and the BSS link information corresponding to at least one access point capable of performing the network discovery from the first and second beacon messages, and then the process proceeds to step 415. In addition, in step 415, the controller 201 selects any one of the first and second access points 103 and 117 based on the BSS link information, the RSSI value, and the first and second connection information, and then the process proceeds to step 417.

In step 417, the controller 201 connects the selected access point and the local area communication resource. At this point, the controller 201 connects the automatically selected access point and the local area communication resource by using the connection information corresponding to the selected access point.

Figure 5:
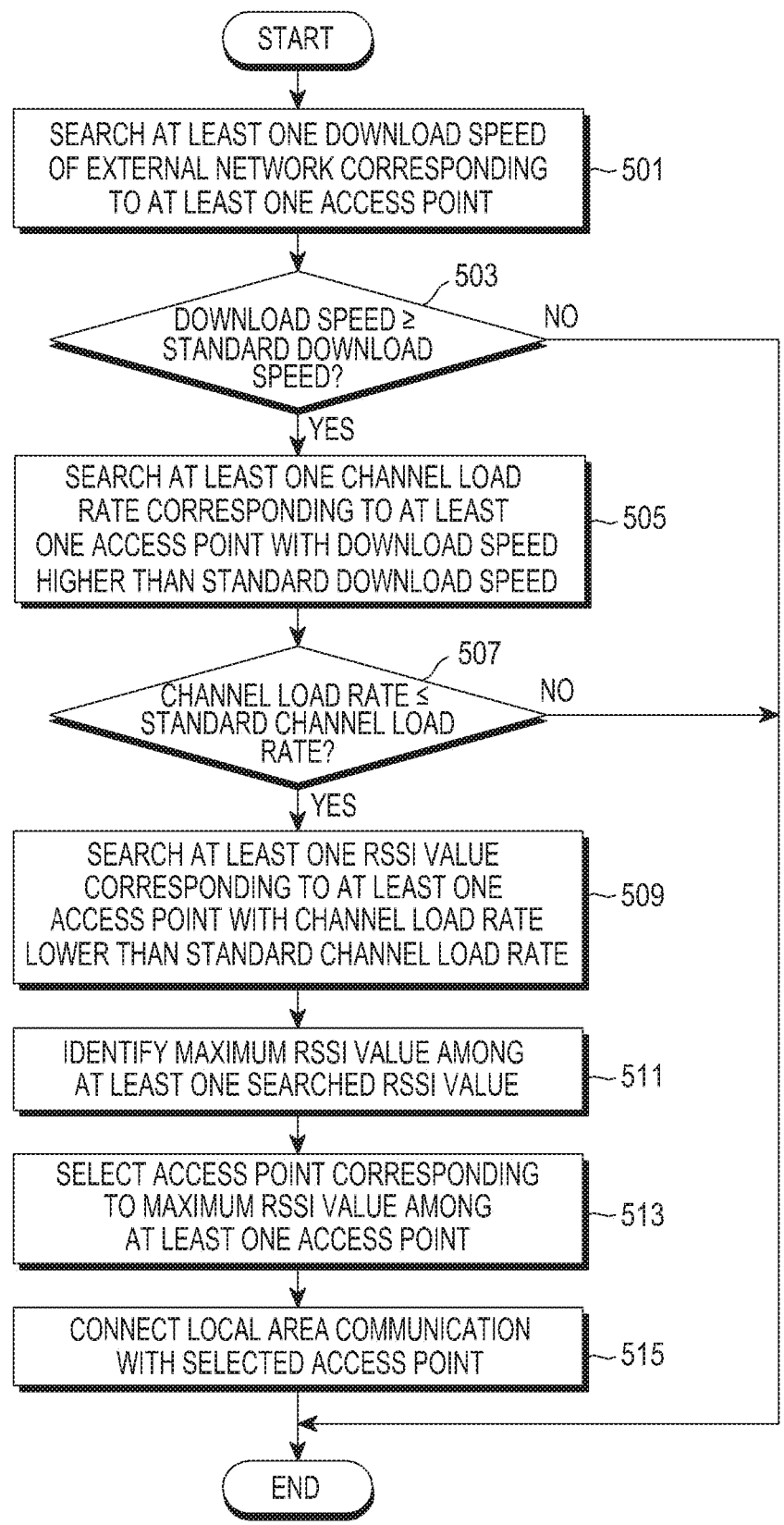
FIG. 5 is a flowchart illustrating an operation of selecting an access point by a portable terminal according to a first exemplary embodiment of the present invention.

FIG. 5 is a flowchart illustrating an operation of selecting an access point by a portable terminal according to a first exemplary embodiment of the present invention.

Referring to FIG. 5, in step 501, the controller 201 searches a download speed of at least one external network corresponding to the at least one access point capable of performing the network discovery from the received link information of the external network, and then the process proceeds to step 503.

In step 503, the controller 201 compares the searched download speed of the at least one external network with the predetermined standard download speed. Based on the comparison result, the controller 201 identifies at least one access point corresponding to the download speed of the external network higher than the predetermined standard download speed among the at least one access point, and the process proceeds to step 505. Otherwise, if at least one access point corresponding to the download speed of the external network higher than the predetermined standard download speed among the at least one access point is not found, the controller 201 terminates an operation of selecting an access point.

In step 505, the controller 201 searches at least one channel load rate corresponding to at least one access point identified in step 503 from the received BSS information, and the process proceeds to step 507. In step 507, the controller 201 compares the at least one searched channel load rate with the predetermined standard channel load rate. Based on the comparison result, the controller 201 identifies at least one access point corresponding to the channel load rate lower than the predetermined standard channel load rate among the at least one identified access point, and then the process proceeds to step 509. Otherwise, if at least one access point corresponding to the channel load rate lower than the predetermined standard channel load rate among the at least one identified access point does not exist, the controller 201 terminates an operation of selecting the access point.

In step 509, the controller 201 searches at least one RSSI value corresponding to the at least one access point identified in step 507. In step 511, the controller 201 identifies the maximum RSSI value among the searched RSSI values, and the process proceeds to step 513. In step 513, the controller 201 selects at least one access point corresponding to the maximum RSSI value among the at least one access point identified in step 507, and then the process proceeds to step 515.

In step 515, the controller 201 connects the selected access point and the local area communication resource.

Figure 6:
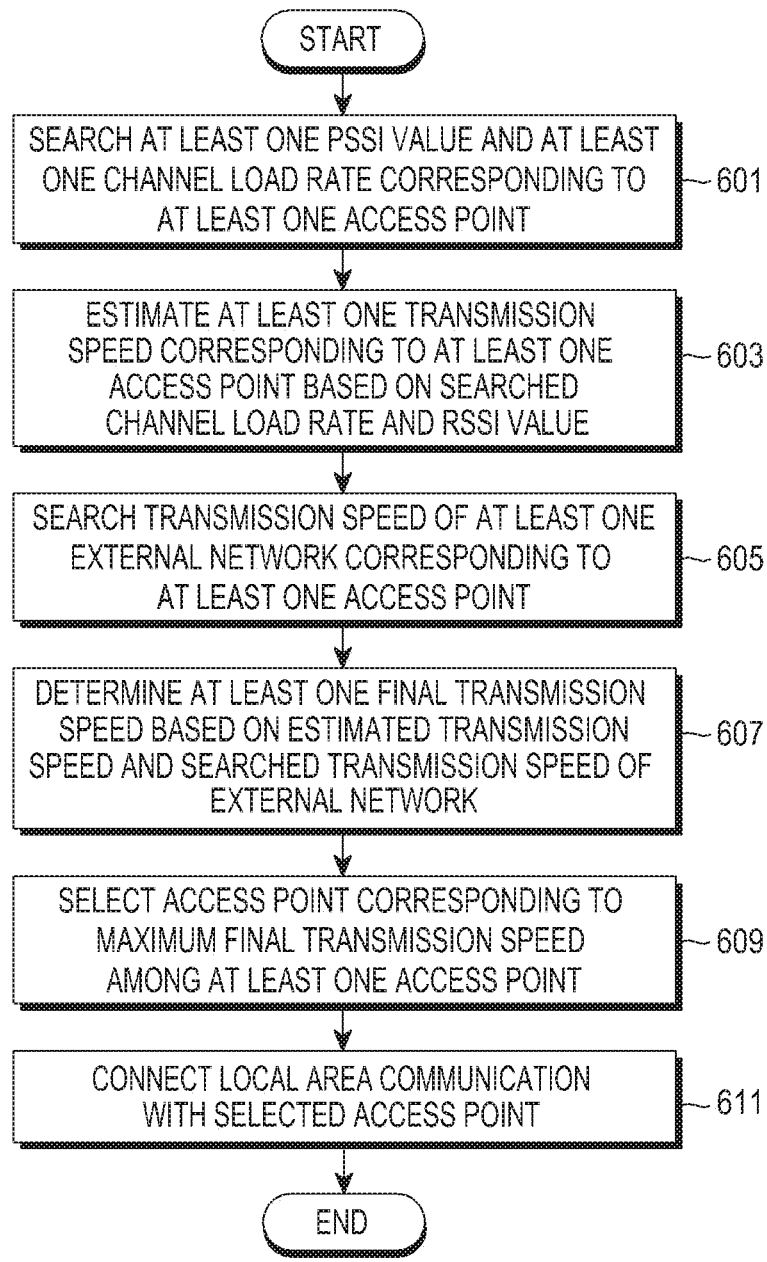
FIG. 6 is a flowchart illustrating an operation of selecting an access point by a portable terminal according to a second exemplary embodiment of the present invention.

FIG. 6 is a flowchart illustrating an operation of selecting an access point by a portable terminal according to a second exemplary embodiment of the present invention.

Referring to FIG. 6, in step 601, the controller 201 searches at least one channel load rate corresponding to at least one access point capable of performing the network discovery from the received BSS link information, and at least one RSSI value corresponding to the at least one access point among the measured RSSI values, and then the process proceeds to step 603.

In step 603, the controller 201 estimates at least one transmission speed corresponding to the at least one access point based on the at least one searched channel load rate and the at least one searched RSSI value, and then the process proceeds to step 605.

In more detail, the memory unit 205 stores a table with digitized transmission speeds corresponding to the RSSI value in advance, and the controller 201 searches at least one transmission speed corresponding to the at least one searched RSSI value by using the table. The controller 201 estimates at least one transmission speed corresponding to the at least one access point by using the at least one searched transmission speed and the at least one searched channel load rate.

For example, if the transmission speed corresponding to the RSSI value of the first access point is 30 Mbps and the channel load rate of the first access point is 50%, the controller 201 may estimate the transmission speed (15 Mbps) with respect to the first access point by multiplying the transmission speed corresponding to the RSSI value and the channel load rate corresponding to the RSSI value.

In step 605, the controller 201 searches the transmission speed of the at least one external network corresponding to the at least one access point from the received link information of the external network, and then the process proceeds to step 607.

In step 607, the controller 201 estimates at least one final transmission speed based on the at least one estimated transmission speed and the searched transmission speed of the at least one external network, and then the process proceeds to step 609. For example, if the estimated transmission speed with respect to the first access point 103 is 10 Mbps and the transmission speed of the external network connected to the first access point 103 is 100 Mbps, the controller 201 may determine the minimum transmission speed as a final transmission speed (10 Mbps) of the first access point 103 among the estimated transmission speed and the transmission speed of the external network. Here, the transmission speed of the external network may be a downlink speed or an uplink speed of the external network.

In step 609, the controller 201 identifies the maximum final transmission speed among the at least one estimated final transmission speed, the controller 201 selects at least one access point corresponding to the identified maximum final transmission speed among the at least one identified access point, and then the process proceeds to step 611.

In step 611, the controller 201 connects the selected access point and the local area communication resource.

According to the operations, an exemplary embodiment of the present invention provides an effect of providing the optimum communication quality by connecting to a local area communication resource in a portable terminal via an access point with an excellent communication environment among a plurality of access points. An exemplary embodiment of the present invention provides an effect of providing an optimum communication quality by selecting an access point with an excellent communication environment among a plurality of access points based on the link information of the external network in the portable terminal, and connecting to the local area communication resource in the portable terminal via the selected access point.

An apparatus and a method for connecting to the local area communication resource in the portable terminal according to an exemplary embodiment of the present invention may be implemented by a computer-readable code on a computer-readable recording medium. The computer-readable recording medium includes all kinds of recording apparatuses on which data that can be read by a computer system is stored. An example of the recording medium includes ROM, RAM, an optical disc, a magnetic tape, a floppy disc, a hard disk, and a non-volatile memory, and includes the form of carrier waves (for example, transmission via the Internet). The computer-readable recording medium may be distributed in the computer system connected via network, and may store and execute computer-readable codes in a distributed manner.

Accordingly, an exemplary embodiment of the present invention provides an effect of providing the optimum communication quality by connecting to a local area communication resource in a portable terminal via an access point with an excellent communication environment among a plurality of access points.

An exemplary embodiment of the present invention provides an effect of providing an optimum communication quality by selecting an access point with an excellent communication environment among a plurality of access points based on the link information of the external network in the portable terminal, and connecting to the local area communication resource in the portable terminal via the selected access point.

Throughout the description and claims of this specification, the words "comprise" and "contain" and variations of the words, for example "comprising" and "comprises," means "including but not limited to," and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for connecting to a local area communication resource, the apparatus comprising:
   a local area communication circuit; and
   a processor configured to:
   receive access point connection-related information, including basic service set (BSS) link information, and automatic connection support-related information from a plurality of access points,
   identify at least one access point capable of performing automatic connection support from among the plurality of access points based on the automatic connection support-related information indicating hotspot 2.0 indication element,
   receive connection information including link information of an external network from an access network query protocol (ANQP) information server connected to each of the at least one access point, wherein the connection information corresponds to hotspot 2.0 ANQP element,
   identify one or more access points with a download speed of the external network higher than a predetermined standard download speed, and with a channel load rate lower than a predetermined standard channel load rate from among the at least one access point, wherein the download speed is included in the link information of the external network, and the channel load rate is included in the BSS link information included in the access point connection-related information corresponding to each of the at least one access point,
   select a first access point with a maximum Received Signal Strength Indication (RSSI) information from among the one or more access points, and
   perform, through the local area communication circuit, a local area communication with the selected first access point.

2. The apparatus according to claim 1, wherein the BSS link information includes a channel load rate of a corresponding access point and a number of portable terminals connected to the corresponding access point.

3. The apparatus according to claim 1, wherein the connection information includes link information of a first external network connected to a corresponding access point generating a local area network, information of a service provider providing the first external network, and information including a connection type for connecting to the local area network.

4. The apparatus according to claim 1, wherein a plurality of external networks connected to the plurality of access points are provided by different service providers.

5. The apparatus according to claim 1, wherein the processor is further configured to select a second access point from among the at least one access point based on the channel load rate included in the BSS link information corresponding to each of the at least one access point, a transmission speed included in the link information of the external network included in the connection information, and RSSI information corresponding to each of the at least one access point.

6. The apparatus according to claim 5, wherein the processor is further configured to estimate a transmission speed corresponding to each of the at least one access point based on the channel load rate and the RSSI information, identify at least one final transmission speed based on the estimated transmission speed and the transmission speed included in the link information of the external network, and select the second access point with a maximum final transmission speed from among the at least one access point.

7. A method for connecting to a local area communication resource, the method comprising:
   receiving access point connection-related information, including basic service set (BSS) link information, and automatic connection support-related information from a plurality of access points;
   identifying at least one access point capable of supporting automatic connection from among the plurality of access points based on the automatic connection support-related information indicating hotspot 2.0 indication element;
   receiving connection information including link information of an external network from an access network query protocol (ANQP) information server connected to each of the at least one access point, wherein the connection information corresponds to hotspot 2.0 ANQP element;
   identifying one or more access points with a download speed of the external network higher than a predetermined standard download speed, and with a channel load rate lower than a predetermined standard channel load rate from among the at least one access point, wherein the download speed is included in the link information of the external network, and the channel load rate is included in the BSS link information included in the access point connection-related information corresponding to each of the at least one access point;

selecting a first access point with a maximum Received Signal Strength Indication (RSSI) information from among the one or more access points; and performing, through a local area communication circuit, a local area communication with the selected first access point.

8. The method according to claim 7, wherein the BSS link information includes a channel load rate of a corresponding access point and a number of portable terminals connected to the corresponding access point.

9. The method according to claim 7, wherein the connection information includes link information of a first external network connected to a corresponding access point generating a local area network, information of a service provider providing the first external network, and information including a connection type for connecting to the local area network.

10. The method according to claim 7, wherein a plurality of external networks connected to the plurality of access points are provided by different service providers.

11. The method according to claim 7, further comprising selecting a second access point from among the at least one access point based on the channel load rate included in the BSS link information corresponding to each of the at least one access point, a transmission speed included in the link information of the external network included in the connection information, and RSSI information corresponding to each of the at least one access point.

12. The method according to claim 11, wherein the selecting of the second access point comprises:

estimating a transmission speed corresponding to each of the at least one access point based on the channel load rate and the RSSI information, identifying at least one final transmission speed based on the estimated transmission speed and the transmission speed included in the link information of the external network, and selecting the second access point with a maximum final transmission speed from among the at least one access point.

\* \* \* \* \*